United States Patent [19]

Mason et al.

[11]  4,426,293
[45]  Jan. 17, 1984

[54] METHOD AND APPARATUS FOR REMOVING OIL FROM WATER

[75] Inventors: Donald G. Mason, Overland Park, Kans.; Frank G. Weis, Kansas City, Mo.

[73] Assignee: Smith & Loveless, Inc., Lenexa, Kans.

[21] Appl. No.: 491,588

[22] Filed: May 4, 1983

[51] Int. Cl.³ .................. C02F 1/40; B01D 13/00; B01D 31/00

[52] U.S. Cl. .................. 210/636; 210/651; 210/744; 210/746; 210/104; 210/110; 210/115; 210/134; 210/195.2; 210/295; 210/DIG. 5

[58] Field of Search .............. 210/636, 651, 655, 744, 210/746, 804, 787–789, 806, 103, 104, 109, 110, 115, 134, 135, 195.2, 257.2, 258, 295, 321.1, 321.5, 335, 433.2, DIG. 5, 512.1, 512.3

[56] References Cited

U.S. PATENT DOCUMENTS

| | | | |
|---|---|---|---|
| 3,515,507 | 6/1970 | Estabrook | 8/158 |
| 3,878,094 | 4/1975 | Conley et al. | 210/96 |
| 3,974,068 | 8/1976 | Ebner | 210/23 |
| 4,081,373 | 3/1978 | Rozniecki | 210/114 |
| 4,086,164 | 4/1978 | Noda | 210/651 |
| 4,111,812 | 9/1978 | Baddour | 210/257 |
| 4,191,182 | 3/1980 | Popovich et al. | 128/214 |
| 4,229,297 | 10/1980 | Nohmi | 210/DIG. 5 |
| 4,255,255 | 3/1981 | Ogawa et al. | 210/652 |
| 4,276,177 | 6/1981 | Smith | 210/638 |
| 4,304,671 | 12/1981 | Labaquere | 210/636 |
| 4,315,822 | 2/1982 | Jaisingani | 210/794 |

OTHER PUBLICATIONS

DFX Dual–Flow Granular Media Filter Literature—C. E. Natco, Combustion Engineering Inc.
Hyde Oil–Water Separator System Literature.
Red Fox Bilge System Oil/Water Separator–Red Fox Industies, Inc.
Sasakura Engineering Co. Ltd. Literature.
McTighe Oil Water Separator for Special Systems Literature.
Harco Fuel/Water Separator Literature–Harco Manufacturing Company.
Heishin Pump Works Ltd. of Japan Literature.
Sarex Oily Water Separator Literature—Separation and Recovery Systems (Europe), S.A.
GE Oil/Water Separator Literature—General Electric Inc.
Facet Model 2000 Literature—Facet Environmental Systems.
Model R–10–2 Literature—Oil MOP Inc.
Fram Coalescing Plate Literature.
Facet Oil–Water Separation System—Facet Environment Systems.
OSMO SEPRALATOR Literature—Osmonics, Inc.

Primary Examiner—Ernest G. Therkorn
Attorney, Agent, or Firm—Dressler, Goldsmith, Shore, Sutker & Milnamow, Ltd.

[57] ABSTRACT

A method and apparatus for removing oil from water. The invention includes a separation vessel for separating the oil by gravity from the water. The generally oil-free water from the separation vessel is pumped under pressure through an ultrafine molecular filter. The concentrate liquid from the ultrafine molecular filter is directed into a concentrator vessel which separates out the oil which remains in the concentrate liquid. The separated oil is directed back into the separation vessel and the remaining liquid is directed back through the ultrafine molecular filter. Ejection water is periodically directed into the separation vessel to discharge oil accumulated in the separation vessel.

40 Claims, 2 Drawing Figures

METHOD AND APPARATUS FOR REMOVING OIL FROM WATER

BACKGROUND OF THE INVENTION

The present invention is directed to an improved method and apparatus for removing oil from water or water from oil.

Water and oil frequently get mixed together in various industrial processes or operations. Oil is typically used to lubricate, to fuel, and to provide rust protection. Water is typically used to convey, to dilute, and to wash. The result is that these two liquids frequently get intermingled. Before either can be transported to waste, or be reused, or be used for other less selective operations, they must be separated.

Ship bilge water normally contains substantial quantities of oil. In the past, bilge water was merely pumped overboard, but due to recent environmental controls, it is required that the oil be separated from the bilge water before the water is discharged. Specifically, in order to obtain U.S. Coast Guard approval of oil/water separation units aboard ships, for removing oil from bilge water, it is necessary that the effluent from the unit be less than 15 ppm oil in the water. Although various types of oil separating units have been used in the past to separate oil from bilge water, none of them have consistently produced the results required by the U.S. Coast Guard. Such heretofore known units have included the following:
1. API gravity separators;
2. Parallel plate separators;
3. Parallel plate separators followed by coalescing filters;
4. Chemical settling where flocculants or polyelectrolytes are used;
5. Electrical charge systems; and
6. Air floatation.

All of these types of units do not perform consistently and produce water effluents sufficiently free of oil sheen or oil sufficiently free of water droplets. These units further require extensive attention to control in order to produce the best possible results.

An example of a process and apparatus for separating oil from water is disclosed in U.S. Pat. No. 4,315,822. The system disclosed in this patent discloses the pumping of the oil contaminated water by a low emulsifying pump from the bilge to an oil gravity separator. As the oil and water mixture flows into the separator, the large oil droplets rise to the top of the separator vessel. After this initial separation, the water flows through a plurality of inclined parallel plates in the separator vessel to facilitate the separation of the oil droplets from the water. The water, after gravity separation of the oil, is pumped to a regenerative filter, which is composed of a plurality of superimposed layers of granular media. After removal of oil in the regenerative filter, the water flows through an oil content monitor and then is pumped overboard. If the oil level in the clarified water exceeds a given value, such as 15 ppm, the monitor activates a valve to recycle the water back to the system inlet. This final step is necessary due to the fact that the system disclosed in this patent can not consistently achieve the necessary effluent values.

SUMMARY OF THE INVENTION

The improved method and apparatus in accordance with the present invention includes a separation vessel having an upper oil accumulation section, a central inlet section and a lower water removal section. The oil and water mixture enters the central inlet section through a perforated pipe, which breaks up the entering liquid into drops at a low velocity. The oil droplets or oil float in the water in the central inlet section and rise and collect in the oil accumulation section. The separation vessel is provided with a water transfer line for withdrawing liquid from the water removal section and an ejection water inlet line, having a control valve associated therewith, for periodically directing ejection water into the separation vessel below the oil accumulation section.

The liquid withdrawn through the water transfer line is directed to an oil barrier vessel having an ultrafine molecular filter positioned therein. A pump means is positioned within the water transfer line for withdrawing the liquid from the water removal section and directing same into the oil barrier vessel under pressure and through the ultrafine molecular filter. In so doing a low pressure area is created in the separation vessel which causes additional inlet liquid to enter the separation vessel. The ultrafine molecular filter removes any oil which remains in the liquid passing through the transfer line. The permeate liquid, or effluent water, is removed from the oil barrier vessel through a permeate effluent line having a flow control valve associated therewith. The concentrate liquid is removed from the oil barrier vessel through a concentrate effluent line and directed into a concentrator vessel, i.e. a cyclone separator, to concentrate any oil remaining in the concentrate liquid in a small volume of water. This small volume of concentrated oil and water is withdrawn from the concentrator vessel and directed through a transfer line back into the inlet section of the separation vessel, while the bulk of the liquid from the concentrator vessel is recycled back through the oil barrier vessel.

When the oil accumulates in the oil accumulation section of the separation vessel such that the bottom of the oil approaches a sensor positioned therein, the separation cycle is terminated and an ejection cycle is initiated. The sensor closes the control valve in the permeate liquid effluent line and opens the control valve in the ejection water inlet line. The ejection water is cycled through the system and back into the water removal section, which water displaces the oil in the oil accumulation section upward and forces the oil out through an oil effluent line into an oil holding vessel. The sensor determines when the bottom of the oil layer has risen a prescribed and preset distance, at which point the ejection cycle is terminated. Upon termination of the ejection cycle the control valve in the water inlet line is closed and the control valve in the permeate liquid effluent line is opened, returning the system to its separation cycle. This completes the normal operating cycle.

In accordance with a preferred form of the invention, the system also includes a wash cycle to clean the membrane within the oil barrier vessel. A wash tank is provided to store a cleaning liquid and means are provided to periodically cycle the cleaning liquid through the membrane within the oil barrier vessel.

In accordance with a second preferred embodiment of the invention, alternative piping is provided to direct the ejection water upwards through the permeate effluent line and thereby serve as a backward flush of the membrane in the oil barrier vessel. Also, the piping permits the cleaning water during the wash cycle to be directed in both directions through the member by opening and closing the proper valves. By so alternating the direction of flow, the membrane can be kept cleaner for a longer period of time.

DESCRIPTION OF PREFERRED EMBODIMENT

Figure 1:
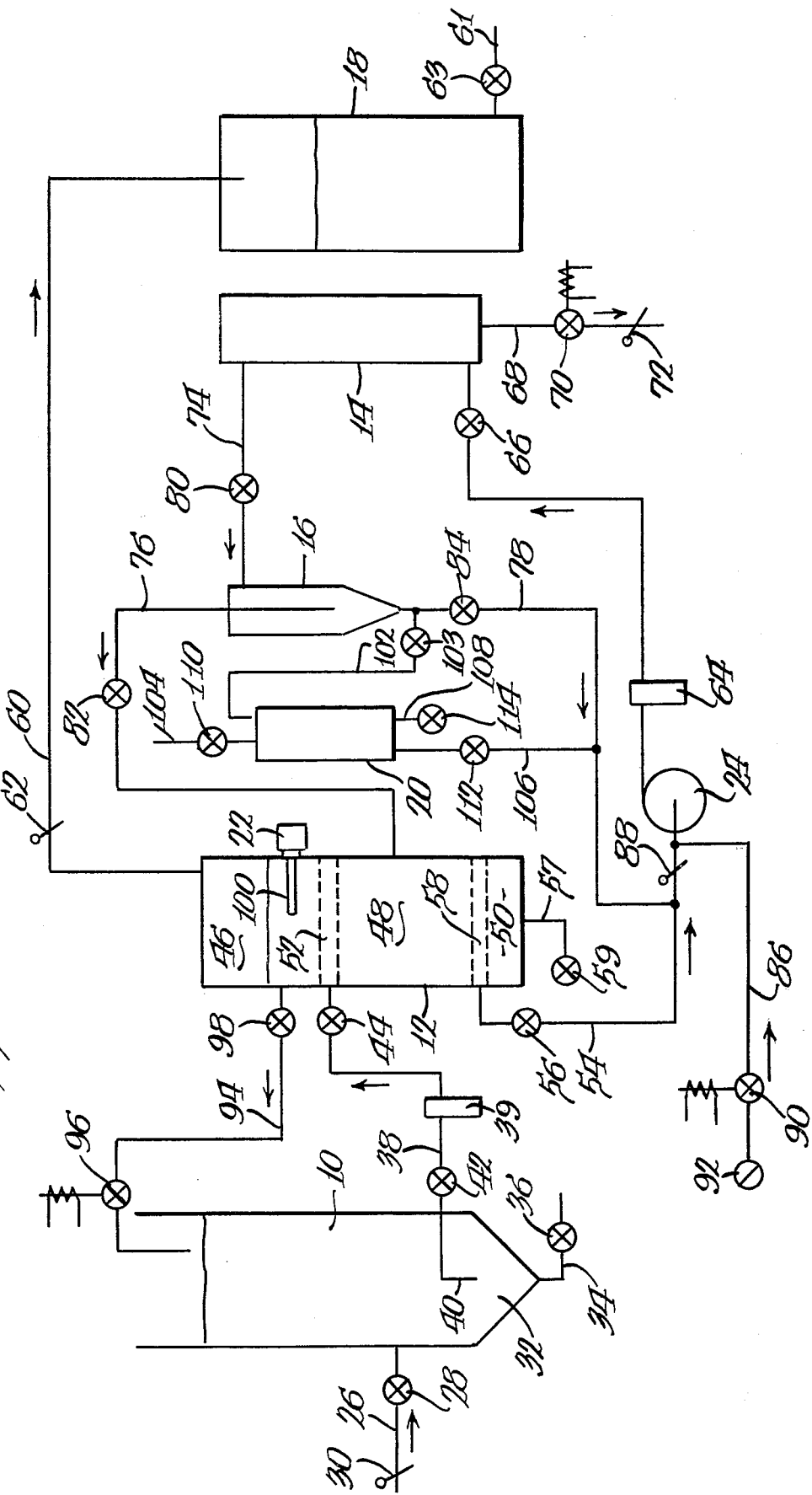
FIG. 1 is a schematic representation of a first preferred embodiment of the invention.

A first preferred embodiment of the invention is illustrated schematically in FIG. 1. The system includes an oil/water holding tank 10, a separation vessel 12, an oil barrier vessel 14, a concentrator vessel 16, an oil holding tank 18, a wash tank 20, a sensor means 22, a pump 24 and various piping and control valves.

Holding tank 10 has an inlet line 26 having a control valve 28 and a check valve 30. The flow of liquid into holding tank 10 is controlled by valve 28 and the check valve 30 prevents the flow of liquid from holding tank 10 back through inlet line 26. Holding tank 10 is preferrably formed with a conical shaped bottom portion 32 which communicates with a drain line 34 having a control valve 36. An oil/water influent line 38 extends into holding tank 10 and has a first end portion 40 which extends vertically downward into bottom portion 32. Liquid from holding tank 10 is withdrawn through influent line 38. Influent line 38 preferably has a strainer 39 positioned therein which is preferably isolated by isolation valves 42 and 44.

Separation vessel 12 has an upper oil accumulation section 46, a central inlet section 48 and a lower water removal section 50. A second end of influent line 38 extends into the inlet section 48 of the separation vessel to direct liquid from the holding tank 10 thereinto. For reasons which will hereinbelow become more apparent, the second end of influent line 38 is in communication with a perforated distribution pipe 52 to properly direct the incoming liquid into the separation vessel. A transfer line 54, having a control valve 56, has a first end in communication with the water removal section 50 to withdraw liquid therefrom and, as will hereinbelow become more apparent, to direct ejection water thereinto. The first end of transfer line 54 is in communication with a perforated header pipe 58 positioned in a lower portion of the water removal section 50. An oil effluent line 60 is provided with a first end in communication with an upper portion of the oil accumulation section 46 and a second end in communication with the oil holding tank 18. A check valve 62 is provided in line 60 to prevent oil from holding tank 18 from flowing back into separation vessel 12. Holding tank 18 is also provided with an outlet line 61 having a control valve 63. A drain line 57 extends from a lower portion of vessel 12 and has a control valve 59 associated therewith.

Oil barrier vessel 14 contains an ultrafine molecular filter having a particular pore size in accordance with the present invention, which will be hereinbelow further discussed. A second end of transfer line 54 is in communication with oil barrier vessel 14 to direct liquid into vessel 14. Pump 24 is positioned in transfer line 54 to pump the liquid from transfer line 54 into oil barrier vessel 14 at the design pressure of the ultrafine molecular filter in vessel 14. A strainer 64 and an isolation valve 66 are also preferably provided in transfer line 54. Oil barrier vessel 14 has a permeate liquid effluent line 68 for withdrawal of oil-free liquid from vessel 14. Line 68 is provided with a solenoid valve 70 to control flow through line 68 and a check valve 72 to preclude flow back into vessel 14.

In accordance with the preferred embodiment of the invention, concentrator vessel 16 is a cyclone separator. Cyclone separator 16 receives the concentrate liquid from oil barrier vessel 14 through a concentrate liquid effluent line 74 extending therebetween. A concentrated oil transfer line 76 has a first end which receives concentrated oil from the cyclone separator 16 and a second end which directs the concentrated oil back into the inlet section 48 of the separation vessel 12. A transfer line 78 has a first end which receives water with a reduced oil content from the cyclone separator 16 and a second end which directs this water back into transfer line 54 upstream of pump 24. Isolation valves 80, 82, and 84 are respectively provided in lines 74, 76, and 78. The function and operation of cyclone separator 16 will hereinbelow be further discussed.

An ejection water inlet line 86 has a first end in communication with a source of fresh water having a high blow rate (i.e. 30 GPM or higher) and a second end for directing the ejection water into line 54 at a point intermediate pump 24 and a check valve 88, which prevents back flow of liquid into separation vessel 12. Ejection water inlet line 86 is provided with a solenoid valve to control the flow of water through line 86 and an isolation valve 92. The functions of solenoid valves 70 and 90 will hereinbelow be further discussed.

In accordance with a preferred embodiment of the invention, an oily sludge removal line 94 may be provided having a first end in communication with the separation vessel 12 at the interface between sections 46 and 48 and a second end in communication with oil/water holding tank 10. Line 94 is provided with a solenoid valve 96 and an isolation valve 98, the purpose of which will hereinbelow become more apparent.

Sensor means 22 includes a probe portion 100 which extends into separation vessel at an elevation at the interface between the sections 46 and 48. Sensor means 22 is preferably a capacitance-type probe having a range of 25 to 50 picofarads. An example of such a probe is manufactured by Magnetral International Inc. under model no. series 80. Sensor means 22 is suitably installed and connected to control the solenoid valves 70, 90 and 96, in a manner which will hereinbelow become more apparent.

In accordance with a preferred embodiment of the invention, an arrangement is provided to periodically clean the ultrafine molecular filter in oil barrier vessel 14. This arrangement includes a wash tank 20 having an inlet line 104, transfer lines 102 and 106 and a drain line 108 in communication therewith. Inlet line 104 is in communication with a source of cleaning liquid and has a control valve 110. Transfer line 102 extends between an upper portion of tank 20 and line 78 above valve 84, and has a control valve 103 associated therewith. Transfer line 106 extends between a lower portion of tank 20 and an intermediate portion of water transfer line 78, and has a control valve 112 associated therewith. Drain line 108 has a control valve 114 associated therewith.

The description of the operation of the system which follows will provide further details of the apparatus and describe the method in accordance with the present invention.

The liquid to be treated is pumped through line 26 into holding tank 10. This liquid may be ship bilge water which contains substantial quantities of oil. In such instance, the liquid within holding tank 10 is a mixture of water and oil and the discussion which hereinbelow follows shall assume same. However, it should be understood that under certain circumstances the liquid in tank 10 may be substantially all water or substantially all oil.

During the separation cycle of the system, all of the valves are in an open position except for valves 36, 59, 63, 70, 90, 96, 110, 112, and 114 and the pump 24 is on. Pump 24 draws the oil/water mixture from holding tank 10 through line 38 and distribution pipe 52 into separation vessel 12. Due to the specific arrangement of end portion 40 of line 38, and the fact that some separation takes place in the tank 10, the liquid drawn from the bottom of line 38 goes from substantially all water to substantially all oil and thereby lessens the burden on the separation vessel 12. The larger solid particals in the liquid passing through line 38 are removed by strainer 39.

The liquid entering separation vessel 12 is distributed into inlet section 48 through perforated pipe 52. In accordance with a preferred form of the invention having an output of 5 gpm, pipe 52 is approximately two to two and a half inches in diameter and has a plurality of uniformly spaced openings therein of approximately one quarter inch in diameter. The relatively large diameter of the pipe 52 reduces the entering velocity of the liquid into section 48 and the relatively small openings in pipe 52 breaks up the entering liquid into small drops of oil at a low velocity. The velocity is preferably designed to be low enough such that it is dissipated in a few inches. The small droplets of oil have a relatively high surface area in relationship to its volume which facilitates the opportunity for the oil droplets to break free from the water. The oil droplets and oil float in the water to the top of separation vessel 12 and collect in the oil accumulation section 46 and the remaining liquid enters the water removal section 50.

The liquid in water removal section 50 is substantially all water, however it may contain small quantities of unseparated oil. This liquid is removed from section 50 through perforated header pipe 58 and is pumped under pressure through line 54 by pump 24 into the bottom of oil barrier vessel 14. Pump 24 breaks up any oil remaining in the liquid into a fine emulsion and thereby tends to prevent oil emulsion droplets from coating the molecular filter membrane material. As alluded to above, oil barrier vessel 14 contains an ultrafine molecular filter which separates out any oil remaining in the liquid entering vessel 14. In accordance with a preferred form of the invention, the ultrafine molecular filter has a molecular organic cut-off weight in the range of 1,000 (1.3 angstroms) to 50,000 (3.3 angstroms), with a normal operation at 20,000 (2 angstroms). Since a water molecule is smaller than 1,000 molecular weight and an organic oil molecule is slightly larger than 50,000 molecular weight, the oil molecule does not pass through the pores of the molecular filter whereas the water molecule passes through the pores of the molecular filter. The oil molecule varies in size because of the various constituents in the oil. The oil is not composed of one type of molecule, but is a mixture of many molecules some smaller than others. Accordingly, it is possible for some of the smaller oil molecules to distort in shape and pass through a hole smaller than the molecule size. The possibility of this happening is dependent upon the nearness of the size of the oil molecule to the pore size and the pressure differential across the membrane. Various membrane materials are preferentially wetted by water or by oil. If the membrane material is preferentially wetted by water, the surface and the surface of the pore have a film of water on them. This further reduces the pore size to the passage of an oil molecule by the film thickness of the water film and the fact that the high surface tension of the water across the small pore tends to prevent the oil molecule from passing through the pore. Therefore, it is advantageous to select a membrane material that is preferentially wetted by water instead of oil if the objective is to preclude oil molecules from passing through the membrane. Accordingly, it is preferred to utilize a preferentially wetted by water membrane material such as a cellulose acetate membrane. However, other membrane materials of finer pore size can be used to prevent the oil molecule from passing therethrough, but at the penalty of a reduced water rate. An example of an ultrafine molecular filter contemplated for use in oil barrier vessel 14 is the Seprolator 20K-Ca manufactured by Osmonics, Inc. Such a filter includes a membrane material which is spiral wound around a permeate tube which is in communication with line 68. For reasons which will become more apparent, the filter in accordance with a second embodiment of the invention must permit the flow of liquid therethrough from either direction.

As the liquid from line 54 passes through the oil barrier vessel 14 in accordance with the above discussion, the permeate liquid from the molecular filter is directed into permeate liquid effluent line 68 and leaves the system. The permeate liquid entering line 68 is water which is substantially free of oil, i.e. less than 15 ppm oil in water. The concentrate liquid from the molecular filter is directed into concentrate liquid effluent line 74. The concentrate liquid is typically a mixture of oil and water.

Although the present invention contemplates recycling the concentrate liquid directly back into the inlet section 48 of separation vessel 12, in accordance with a preferred embodiment of the invention the concentrate liquid is directed into concentrator vessel 16 to separate most of the oil from the water prior to returning same to the separation vessel 12. As alluded to above, concentrator vessel 16 may take the form of a cyclone separator. In such instance, the liquid entering the vessel 16 through line 74 is rotated at a high gravity force which causes the lighter oil to separate from the water and move to the middle of the vessel 16 while the bulk of the water remains at the outer portions of vessel 16. The separated oil from the center of vessel 16 is directed through line 76 back into the inlet section 48 of separation vessel 12. The bulk of the water is directed through line 78 back into transfer line 54 to be recycled through oil barrier vessel 14. The cyclone separator is preferably sized to provide a back pressure on line 74 to control the flush water rate through vessel 14.

The above description of the operation of the system completes the separation cycle of the system. During this cycle, substantially oil-free water is withdrawn through line 68 and oil is accumulated as an oil layer in oil accumulation section 46 of separation vessel 12. As the oil layer in section 46 continues to increase in volume, the bottom of the oil layer approaches the elevation of capacitance probe 100 of sensor means 22 and the separation cycle is terminated.

The sensor means 22 senses the approaching bottom of the oil layer and as it comes into close proximity therewith, the sensor means 22 is operative to close solenoid valve 70, open solenoid valve 90 and shut-off pump 24. In so doing, the separation cycle is terminated and the ejection cycle is initiated.

During the ejection cycle, the ejection water entering ejection water inlet line 86 is cycled serially through line 54, vessel 14, line 74, vessel 16, line 78, back into line 54 on the other side of check valve 88, and into section 50 of vessel 12 through header pipe 58. The ejection water entering section 50 under pressure displaces the oil in accumulation section 46 upward into oil effluent line 60 through check valve 62 and into oil holding tank 18. The ejection water exits from the openings in header pipe 58 which breaks up the velocity so that it is dissipated in a short distance of several inches. The passage of the ejection water serves the dual purpose of ejecting the oil from vessel 12 and to provide for the passage of fresh oil-free flush water through vessel 14 during each ejection cycle. As the bottom of the oil layer rises in section 46 a prescribed and preset distance the sensor means 22 is activated to close solenoid valve 90, open solenoid valve 70 and start-up pump 24. It is preferred to leave a small layer of oil in the section 46 at the end of each ejection cycle to ensure that water does not exit with the oil. The system is now ready for the next separation cycle.

The above described separation cycle and ejection cycle are alternately repeated during the normal operation of the system. The separated oil is collected in oil holding tank 18 for subsequent removal therefrom for further use or disposal through line 61, upon opening valve 63, and the separated water is directed through line 68 for further use or disposal.

Occasionally a layer of heavy oily sludge, that is heavier than oil and lighter than water, may accumulate at the bottom of the oil layer in section 46. This sludge may be periodically removed, either manually by opening valve 98 or automatically by opening solenoid valve 96, during an oil ejection cycle so that some of the layer is removed from vessel 12 through line 94 to the holding tank 10. If done automatically, the solenoid valve 96 may be operatively controlled by the sensor means 22.

After repeated separation cycles the molecular filter in vessel 14 may require cleaning. The preferred embodiment of the system includes a wash cycle to periodically cycle a suitable cleaning solution from wash tank 20 through the molecular filter. During the wash cycle the solenoid valves 70 and 90 and the valves 56, 82 and 84 are closed. The valves 103 and 112 are closed and the valve 114 is opened to drain the wash tank 20. The valve 114 is then closed and valve 110 is opened to fill tank 20 with cleaning solution through line 104. After the tank 20 is filled, the valve 110 is closed and the valves 103 and 112 are opened and the pump 24 is started to cycle the cleaning solution. The cleaning solution is cycled for a predetermined period of time serially through line 106, line 78, pump 24, vessel 14, line 74, vessel 16, line 102 and back into tank 20. The cleaning solution is fresh water and a cleaning agent selected for the particular molecular filter in vessel 14. Upon completion of the cleaning step, the valves 103 and 112 are closed and the valve 114 is opened to drain tank 20. The valve 114 is then closed and valve 110 is opened to fill the tank 20 with fresh rinse water. The fresh rinse water is then cycled through the system for a predetermined period of time as disclosed above with regards to the cleaning solution. The system is then restored to its normal operation.

Figure 2:
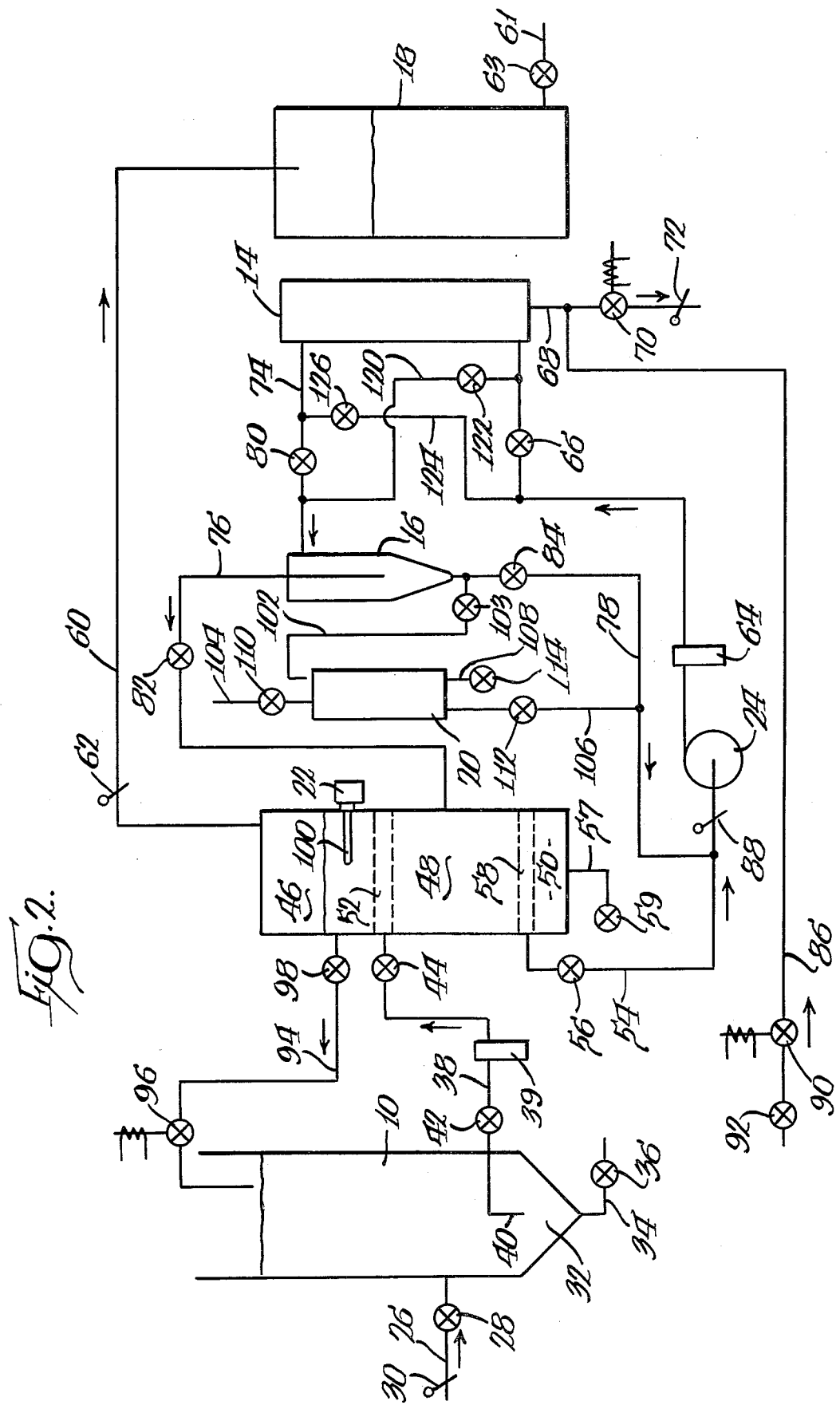
FIG. 2 is a schematic representation of a second preferred embodiment of the invention.

Referring to FIG. 2, an alternative embodiment of the invention is schematically show. This embodiment is in most respects the same as the embodiment shown in FIG. 1 and operates in the same manner as discussed hereinabove. Accordingly, the same reference numerals are used in FIG. 2 to designate corresponding parts in FIG. 1 and the description of the system in FIG. 2 which hereinbelow follows shall only identify and discuss the differences between the two systems.

In the embodiment in FIG. 2, the ejection water inlet line 86 directs the ejection water directly into permeate water outlet line 68 above the solenoid valve 70. Accordingly, during each ejection cycle of this system the ejection water is flushed backwards through the membrane material of the molecular filter in vessel 14. In so doing the ejection water is more effective to clean the molecular filter during each ejection cycle.

The embodiment in FIG. 2 is also provided with a specific piping and valving arrangement to permit the flow of cleaning solution during the wash cycle to be selectively directed in either direction through the membrane material of the molecular filter in vessel 14. The system includes a first transfer line 120, having a valve 122 associated therewith, and a second transfer line 124, having a valve 126 associated therewith. Transfer line 120 extends between line 54 downstream of valve 66 and line 74 upstream of valve 80. Transfer line 124 extends between line 54 upstream of valve 66 and line 74 downstream of valve 80. In operation during the wash cycle, if the valves 122 and 126 are closed the cycling of cleaning solution through the vessel 14 is the same as discussed with regards to the system in FIG. 1. Alternatively, the valves 122 and 126 are opened and the valves 66 and 80 are closed, in which instance the cycling of the cleaning solution through the vessel 14 is in the reverse direction. It is contemplated that the direction of flow of the cleaning solution through the vessel 14 may be periodically reversed which will maintain the membrane material of the molecular filter cleaner for a longer period of time.

The systems as hereinabove described include numerous features which cooperate with each other to provide a unit which is capable of consistently producing good effluent quality results. In particular, the cycling of the fresh ejection water through the oil barrier vessel causes the molecular filter to be cleaned during each ejection cycle with fresh water or water diluted with fresh water. The high flow rate ejection water flow is isolated from the separation vessel which permits dissipation of its energy before entering the separation vessel and thereby does not disturb the oil layer in the separation vessel. Also, the oil concentration in the ejection water transfer line is maintained at minimum levels and the oil in the ejection water transfer line is substantially in the form of a fine emulsion and thereby maintains the membrane material in the molecular filter clean for long periods of time. Further, the cyclone separator reduces the level of oil which is recycled through the oil barrier vessel.

While the invention has been described in relation to its preferred embodiments, it is to be understood that various modifications thereof will be apparent to one skilled in the art upon reading the specification and it is intended to cover such modifications as fall within the scope of the appended claims.

What is claimed is:

1. A method of separating oil from water, comprising the steps of: directing an oil and water mixture into a separation vessel to separate oil by gravity from the water; accumulating a layer of oil in an upper portion of the separation vessel and discharging the generally oil-free water from a lower portion of the separation vessel into a water transfer line; pumping the generally oil-free water in the water transfer line under pressure into an oil barrier vessel containing an ultrafine molecular filter; directing the generally oil free water through the ultrafine molecular filter; withdrawing the permeate liquid from the oil barrier vessel and directing it into a permeate liquid effluent line; withdrawing the concentrate liquid from the oil barrier vessel into a concentrate liquid effluent line; directing at least a portion of the concentrate liquid back into the separation vessel; periodically directing ejection water through an ejection water inlet line having a first control valve associated therewith into a lower portion of the separation vessel for discharging oil accumulated in the upper portion of the separation vessel through an oil effluent line; and sensing the level of the lower layer of the oil in the separation vessel so as to open the first control valve when the level reaches a predetermined lower level and to close the first control valve when the level reaches a predetermined upper level.

2. The method of claim 1 and further including the steps of directing the concentrate liquid from the oil barrier vessel into a concentrator vessel to separate out oil which remains in the concentrate liquid, directing the separated oil through an oil transfer line into the inlet section of the separation vessel and directing the remaining liquid from said concentrator vessel into the water transfer line for recycling back through the oil barrier vessel.

3. The method of claim 2 wherein said concentrator vessel is a cyclone separator that rotates the concentrate liquid at a high gravity force so as to cause the separated oil to move to the center of the concentrator vessel and into the oil transfer line and the remaining liquid to move outwardly to be directed into the water transfer line.

4. The method of claim 1 and further including the steps of periodically closing the first control valve and cycling a cleaning solution from a wash tank through the ultrafine molecular filter in the oil barrier vessel.

5. The method of claim 4 and further including the step of following the cycling of the cleaning solution with the cycling of rinse water through the ultrafine molecular filter in the oil barrier vessel.

6. The method of claim 4 wherein the ultrafine molecular filter permits the flow of liquid therethrough from both directions and further including the step of periodically changing the direction of the flow of the cleaning solution through the ultrafine molecular filter.

7. The method as defined in claim 1 wherein the ejection water from the ejection water inlet line is directed into the water transfer line.

8. The method as defined in claim 1 wherein the ejection water from the ejection water inlet line is directed into the permeate liquid effluent line upstream of the first control valve.

9. The method as defined in claim 1 and further including the steps of directing the oil and water mixture under pressure into a holding vessel and withdrawing the oil and water mixture from the holding vessel through an influent line into a central inlet section of the separation vessel.

10. The method as defined in claim 9 wherein the oil and water mixture is withdrawn from the holding vessel through a downwardly extending end portion of the influent line adjacent a lower portion of the holding vessel.

11. The method as defined in claim 9 and further including the step of periodically withdrawing a layer of heavy oily sludge from the separation vessel through a sludge transfer line and directing the heavy oil sludge into the holding tank.

12. The method as defined in claim 1 further including the step of breaking up the oil and water mixture directed into the separation vessel into small droplets of oil at a velocity low enough to be dissipated in a short distance to float to the upper portion of the separation vessel.

13. The method as defined in claim 1 wherein the sensing of the lower layer of the oil in the separation vessel is through a capacitance-type oil level sensor which extends into the separation vessel at a level adjacent the lower portion of the oil accumulation section.

14. The method as defined in claim 1 wherein the pumping of generally oil-free water in the transfer line is terminated when the level of the lower layer of the oil reaches the predetermined lower level and the pumping of generally oil-free water in the transfer line is started when the level of the lower level of the oil reaches the predetermined upper level.

15. The method as defined in claim 1 wherein a second control valve is provided in the permeate liquid effluent line and the second control is closed when the level of the lower layer of the oil reaches the predetermined lower level and is opened when the level of the lower layer of the oil reaches the predetermined upper level.

16. A system for separating oil from water, comprising: a separation vessel having an upper oil accumulation section, a central inlet section, and a lower water removal section; an influent line for directing an oil and water mixture into said inlet section such that as the oil and water mixture enters said central inlet section the oil is separated from the water and rises into said oil accumulation section; an oil effluent line for removal of oil from said oil accumulation section; a water transfer line for withdrawing liquid from said water removal section extending between said water removal section and said oil barrier vessel; an oil barrier vessel having an ultrafine molecular filter positioned therein; a pump means positioned within said transfer line for withdrawing liquid from said lower water removal section and directing same into said oil barrier vessel under pressure and through said ultrafine molecular filter; a permeate liquid effluent line for withdrawing permeate liquid from said oil barrier vessel; a concentrate liquid effluent line for withdrawing concentrate liquid from said oil barrier vessel and directing at least a portion of the concentrate liquid back into said separation vessel; an ejection water inlet line for periodically directing ejection water into said separation vessel under pressure below said oil accumulation section for ejecting oil from said oil accumulation section through said oil effluent line, said ejection water inlet line having a first control valve for controlling the flow of ejection water through said ejection water inlet line; and sensor means for detecting the lower layer of the oil in said separation vessel so as to open said first control valve when the lower layer of the oil reaches a predetermined lower level and to close said first control valve when it reaches a predetermined upper level.

17. The system as defined in claim 16 wherein said influent line is in communication with a perforated pipe positioned within said inlet section which separates the oil and water mixture into small droplets of oil at a velocity low enough so as to be dissipated in a short distance and float to said oil accumulation section.

18. The system as defined in claim 16 wherein said transfer line is in communication with a perforated header pipe positioned within said water removal section.

19. The system as defined in claim 16 further including a oil/water mixture holding vessel and said influent line extends from a lower portion of said holding vessel into said inlet section.

20. The system as defined in claim 19 wherein an end portion of said influent line within said oil/water mixture holding vessel extends downwardly towards the bottom of said vessel.

21. The system as defined in claim 19 further including a sludge transfer line extending at one end from said separation vessel at an elevation adjacent a lower portion of said oil accumulation section and at the other end into said holding vessel for periodically removing a layer of heavy oily sludge from the separation vessel, said sludge transfer line having a sludge control valve to control the flow therethrough.

22. The invention as defined in claim 21 wherein said sludge control valve is controlled by said sensor means.

23. The system as defined in claim 16 wherein said sensor means is a capacitance-type oil level sensor which extends into said separation vessel adjacent the lower portion of said oil accumulation section.

24. The system as defined in claim 16 wherein said ultrafine molecular filter has a molecular organic cut-off weight of approximately 20,000.

25. The system as defined in claim 16 wherein said ultrafine molecular filter has a molecular organic cut-off weight in the range of 1,000 to 50,000.

26. The system as defined in claim 25 wherein said ultrafine molecular filter includes a membrane material preferentially wetted by water.

27. The system as defined in claim 26. wherein said membrane material is a cellulose accetate material.

28. The system as defined in claim 27 wherein said membrane material is spiral wound around a permeate tube, said permeate tube being in communication with said permeate liquid line.

29. The system as defined in claim 16 further including a concentrator vessel positioned within said concentrate liquid effluent line for receiving concentrate liquid from said oil barrier vessel and separating out at least a portion of the oil which remains in the concentrate liquid.

30. The system as defined in claim 29 wherein a concentrated oil transfer line is provided to transfer the separated oil from said concentrator vessel into said inlet section of said separation vessel and a transfer line is provided to transfer the remaining liquid from said concentrator vessel back into said water transfer line for recycling through said oil barrier vessel.

31. The system as defined in claim 30 wherein said concentrator vessel is a cyclone separator that rotates the concentrate liquid at a high gravity force so as to cause the oil to move to the center of said concentrator vessel and into said concentrated oil transfer line and the remaining liquid to move outwardly and into said transfer line.

32. The system as defined in claim 16 further including a wash tank having an inlet line for delivering cleaning liquid thereinto, a cleaning liquid outlet line extending from said wash tank in communication with said water transfer line on the suction side of said pump, and a cleaning liquid return line from said concentrate liquid effluent line to said wash tank, such that cleaning liquid from said wash tank may be cycled through said water transfer line into said oil barrier vessel and out through said concentrate liquid effluent line back into said wash tank to clean said ultrafine molecular filter.

33. The system as defined in claim 32 wherein said wash water outlet line and said wash water inlet line have isolation valves associated therewith for isolation of said wash tank.

34. The system as defined in claim 32 wherein said ultrafine molecular filter permits liquid to flow therethrough from both ends thereof and means are provided for selectively changing the direction of the flow of cleaning liquid from said water transfer line through said ultrafine molecular filter.

35. The invention as defined in claim 16 wherein a first strainer is positioned in said influent line and a second strainer is positioned in said water transfer line.

36. The system as defined in claim 16 wherein said ejection water inlet line directs ejection water under pressure into said water transfer line.

37. The system as defined in claim 16 wherein said permeate liquid effluent line has a second control valve for controlling the flow of permeate liquid from said oil barrier vessel through said permeate liquid line.

38. The system as defined in claim 37 wherein said sensor means closes said second control valve when the lower layer of the oil reaches said predetermined lower level and opens said second control valve when it reaches said predetermined upper level.

39. The invention as defined in claim 38 wherein said sensor means closes said pump means when the lower layer of the oil reaches said predetermined lower level and starts said pump means when it reaches said predetermined upper level.

40. The system as defined in claim 39 wherein said ejection water inlet line directs ejection water under pressure into said permeate liquid effluent line between said first control valve and said oil barrier vessel so as to direct said ejection water, through said ultrafine molecular filter.

* * * * *